United States Patent [19]

Goodall et al.

[11] Patent Number: 4,548,915

[45] Date of Patent: Oct. 22, 1985

[54] OLEFIN POLYMERIZATION CATALYST COMPOSITION

[75] Inventors: Brian L. Goodall; Robert C. Job, both of Houston, Tex.

[73] Assignee: Shell Oil Company, Houston, Tex.

[21] Appl. No.: 598,616

[22] Filed: Apr. 10, 1984

[51] Int. Cl.$^4$ .................... C08F 4/02; C08F 4/64; C08F 110/06

[52] U.S. Cl. ..................... 502/104; 502/127; 502/128; 502/134; 526/125; 526/142; 526/144; 526/351

[58] Field of Search .................. 502/103–105, 502/128, 134, 169, 127

[56] References Cited

U.S. PATENT DOCUMENTS

| | | | |
|---|---|---|---|
| 4,290,915 | 9/1981 | Toyota et al. | 502/103 |
| 4,329,253 | 5/1982 | Goodall et al. | 502/111 |
| 4,393,182 | 7/1983 | Goodall et al. | 526/125 |
| 4,400,302 | 8/1983 | Goodall et al. | 502/169 |
| 4,414,132 | 11/1983 | Goodall et al. | 502/169 |
| 4,465,783 | 8/1984 | McKenzie | 502/134 |
| 4,472,521 | 9/1984 | Band | 502/104 |

Primary Examiner—P. E. Konopka
Attorney, Agent, or Firm—Dean F. Vance

[57] ABSTRACT

A free-flowing, high activity propylene polymer procatalyst component is prepared by the addition of limited amounts of a mineral oil (e.g., 5 to 25 percent) to the recovered $MgCl_2/TiCl_4$/ED procatalyst. The mineral oil becomes absorbed into the catalyst pores resulting in dry, free-flowing powders which retain their original activity for more than two months. This method of catalyst storage and shipping may prove more convenient than the previously used mineral oil slurries. Further, this technique of introducing suitable inert liquids into the catalyst pores results in substantial improvement in catalyst performance.

7 Claims, 1 Drawing Figure

PERFORMANCE OF CATALYSTS

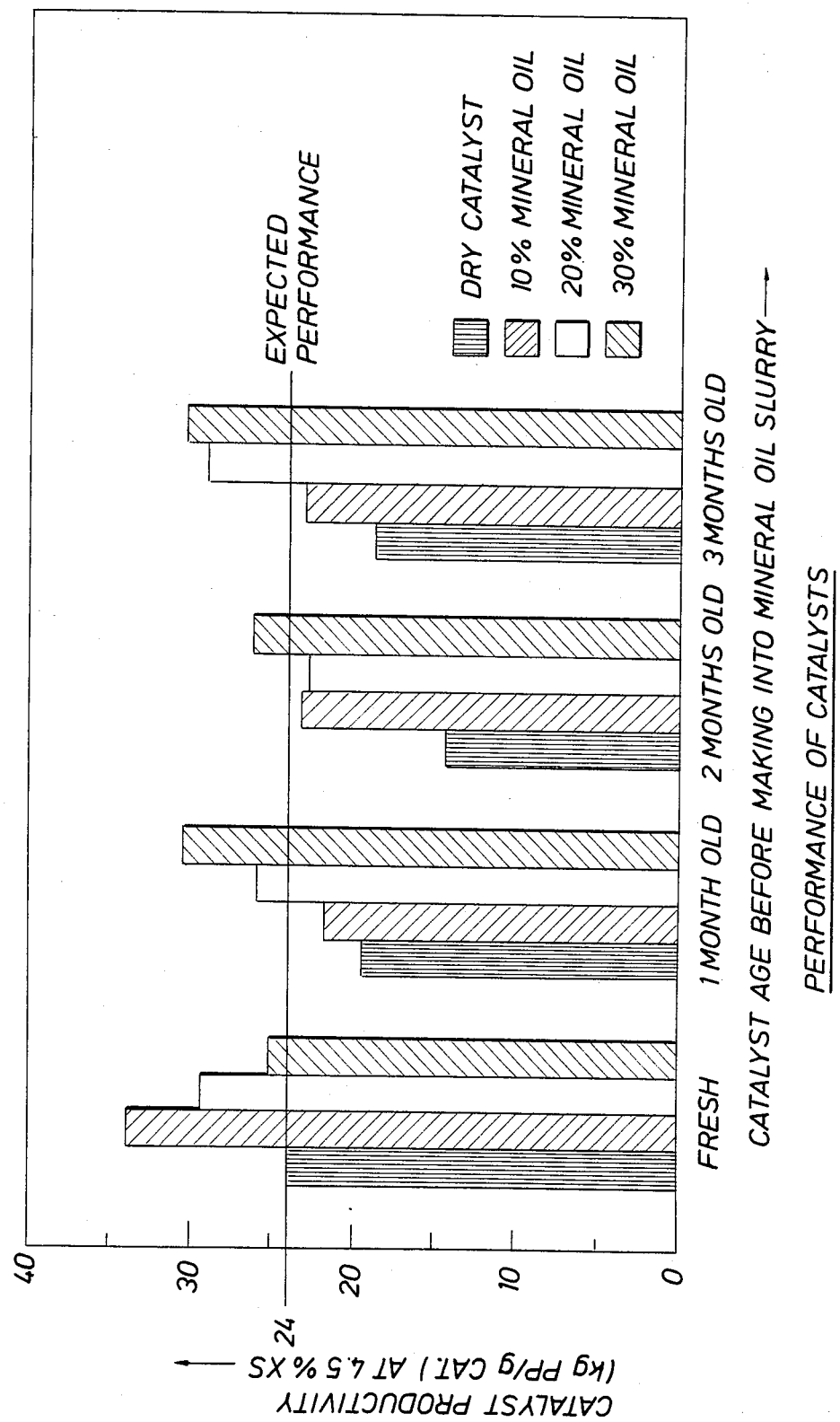

OLEFIN POLYMERIZATION CATALYST COMPOSITION

FIELD OF THE INVENTION

This invention relates to a process for preparing free-flowing solid olefin polymerization catalyst components comprising a magnesium halide/titanium halide/electron donor procatalyst and mineral oil.

BACKGROUND OF THE INVENTION

Numerous proposals are known from the prior art to provide olefin polymerization catalysts by combining a solid component comprising at least magnesium, titanium and chlorine with an activating organoaluminum compound. These may be referred to as supported coordination catalysts or catalyst systems. The activity and stereospecific performance of such compositions is generally improved by incorporating an electron donor (Lewis base) in the solid component and by employing as a third catalyst component an electron donor which may be complexed in whole or in part with the activating organoaluminum compound.

For convenience of reference, the solid titanium-containing constituent of such catalysts is referred to herein as "procatalyst", the organoaluminum compound, whether used separately or partially or totally complexed with an electron donor, as "cocatalyst", and the electron donor compound, whether used separately or partially or totally complexed with the organoaluminum compound, as "selectivity control agent" (SCA).

Supported coordination catalyst of this type are disclosed in numerous patents. The catalyst systems of this type which have been disclosed in the prior art generally are able to produce olefin polymers in high yield and, in the case of catalysts for polymerization of propylene or higher alpha-olefins, with high selectivity to stereoregular polymer. However, further improvements in productivity at high stereoregularity are still being sought.

The objective of workers in this art is to provide catalyst systems which exhibit sufficiently high activity to permit the production of polyolefins in such high yield as to obviate the necessity of extracting residual catalyst components in a deashing step. In the case of propylene and higher olefins, an equally important objective is to provide catalyst systems of sufficiently high selectivity toward isotactic or otherwise stereoregular products to obviate the necessity of extracting atactic polymer components.

Although many chemical combinations provide active catalyst systems, practical considerations have led the workers in the art to concentrate on certain preferred components. The procatalysts typically comprise magnesium chloride, titanium chloride, generally in tetravalent form, and as electron donor an aromatic ester such as ethyl benzoate or ethyl-p-toluate. The cocatalyst typically is an aluminum trialkyl such as aluminum triethyl or aluminum tri-isobutyl, often used at least partially complexed with selectivity control agent. The selectivity control agent typically is an aromatic ester such as ethyl-paramethoxybenzoate(ethyl anisate) or methyl-p-toluate.

While the selection of cocatalyst and selectivity control agent affects the performance of those catalyst systems, the component which appears to be subject to most significant improvement with respect to activity and productivity of the system is the procatalyst.

Preferred methods of preparing such procatalysts are claimed in U.S. Pat. Nos. 4,329,253; 4,393,182; 4,400,302; and 4,414,132. These procatalysts are highly active and stereospecific. The typical manner of preparing such procatalysts involves the reaction of the magnesium compound, titanium tetrachloride and electron donor in the presence of a halohydrocarbon. The resulting solid particles are then contacted with additional quantities of $TiCl_4$ and are completed by washing off excess $TiCl_4$ using light hydrocarbons (e.g., isooctane and isopentane) and drying. Various studies have shown that the resulting procatalyst may suffer from shelf-life problems when stored as a dry powder. Even though the catalysts are always stored under nitrogen, a catalyst which is aged as a dry powder invariably loses activity over time. The exact cause of the activity loss is not known, but the most likely cause is contamination by impurities (especially water). This shelf-life problem was overcome by storing and shipping the catalyst as a slurry in dry mineral oil. The mineral oil slurry method has given excellent results, but has been found to suffer two disadvantages compared to dry-powder shipment:

(i) slurry concentrations vary considerably causing inconsistencies in polymerization plant operation when switching catalyst drums;

(ii) introducing the catalyst as a mineral oil slurry is not optimum for all processes. For example, in gas-phase operation a dry powder or a slurry in a volatile hydrocarbon might be preferable.

In U.S. Pat. No. 4,290,915, the patentee dries the catalyst such that the remaining catalyst contains 1–25% by weight of the inert liquid light hydrocarbon (e.g. n-pentane, cyclohexane, benzene and the like) used in the catalyst preparation. However, the patentee still finds that the catalyst loses activity after storage for as little as two days. Further, there are problems in ascertaining and controlling the level of the inert liquid hydrocarbon in the catalyst.

A new procedure has been found to prepare these catalyst components that not only eliminates the activity loss problem associated with dry catalyst, but also does not have the various disadvantages of the slurry method for storing catalysts.

SUMMARY OF THE INVENTION

The present invention deals with a free-flowing catalyst composition for alpha-monoolefin polymerization and to a preparation process for making such catalyst compositions. More particularly, the present invention broadly deals with a free-flowing, high-activity, stable catalyst composition comprising a porous solid component and a hydrocarbon mineral oil wherein:

(a) said porous solid component comprises titanium tetrachloride, magnesium chloride and electron donor, having a pore volume of between about 0.1 and about 1.0 cubic centimeters per gram (cc/gm);

(b) said hydrocarbon mineral oil is a viscous, paraffinic/naphthenic hydrocarbon oil; and (c) said mineral oil is mixed with said porous solid component such that the mineral oil fills the pores of said solid component and the resulting mineral oil-modified solid component remains relatively dry and free-flowing at ambient conditions.

One of the methods for preparing such free-flowing, solid catalyst components comprises:

(a) halogenating a magnesium compound of the formula MgR'R" wherein R' is an alkoxide or aryloxide group and R" is an alkoxide or aryloxide group or halogen, with a halide of tetravalent titanium in the presence of a halohydrocarbon and an electron donor, separating the solid reaction product from the reaction mixture, optionally washing it with an inert diluent to remove any unreacted material;

(b) contacting the halogenated product with a tetravalent titanium halide and separating the resulting solid from the liquid medium;

(c) contacting the resulting solid with an inert light hydrocarbon liquid to remove unreacted titanium compounds;

(d) adding a certain amount of a hydrocarbon mineral oil to the mixture of light hydrocarbon liquid and solid component wherein said mineral oil is a viscous paraffinic/naphthenic hydrocarbon oil; and (e) removing the light hydrocarbon liquid from the resulting mixture, wherein the amount of hydrocarbon mineral oil adding in step (d) is greater than five (5) percent by weight, based on the combined weight of the solid component plus mineral oil, but is less than the amount whereby the solid component is no longer free-flowing.

Expressed another way, the amount of hydrocarbon mineral oil which is added is greater than 5 percent by weight (based on the combined weight of the mineral oil plus solid component) and is of a volume less than that corresponding to the pore volume of the solid component.

As is shown in the examples which follow, we have shown that:

(i) the addition of about 10 to about 25 percent by weight of mineral oil to certain procatalyst components still leaves the catalyst as a dry, free-flowing powder;

(ii) such modified catalysts have demonstrated vastly improved activities in propylene polymerization;

(iii) when stored as "dry powder" at ambient temperature over long periods (greater than 50 days), these catalysts maintain their activity much better than dry catalysts which have not been modified with mineral oil.

BRIEF DESCRIPTION OF THE DRAWING

The FIGURE shows the relative performance of four catalysts as a function of catalyst age and level of mineral oil addition.

DETAILED DESCRIPTION OF THE INVENTION

The procatalysts which are employed in the catalyst system in this invention may be produced by methods known in the art. These procatalysts are any one of the recently developed, high activity magnesium halide supported catalyst components disclosed e.g., in U.S. Pat. Nos. 3,953,414, 4,051,313, 4,115,319, 4,149,990, 4,211,339, 4,220,554, 4,226,741, 4,263,169, 4,329,253, 4,400,302 and 4,414,132, hereby incorporated in this application by reference.

Examples of halogen containing magnesium compounds that can be used as starting materials for the halogenating reaction are alkoxy and aryloxy magnesium halides, such as isobutoxy magnesium chloride, ethoxy magnesium bromide, phenoxy magnesium iodide, cumyloxy magnesium bromide and naphthenoxy magnesium chloride.

Preferred magnesium compounds to be halogenated are selected from magnesium dialkoxides and magnesium diaryloxides. In such compounds the alkoxide groups suitable have from 1 to 8 carbon atoms, and preferably from 2 to 8 carbon atoms. Examples of these preferred groups of compounds are magnesium di-isopropoxide, magnesium diethoxide, magnesium dibutoxide, magnesium diphenoxide, magnesium dinaphthenoxide and ethoxy magnesium isobutoxide. Magnesium diethoxide is particularly preferred.

In the halogenation with a halide of tetravalent titanium, the magnesium compounds are preferably reacted to form a magnesium halide in which the atomic ratio of halogen to magnesium is at least 1.2. Better results are obtained when the halogenation proceeds more completely, i.e., yielding magnesium halides in which the atomic ratio of halogen to chlorine is at least 1.5. The most preferred reactions are those leading to fully halogenated reaction products, i.e., magnesium-dihalides. Such halogenation reactions are suitably effected by employing a molar ratio of magnesium compound to titanium compound of 0.005:1 to 2:1, preferably 0.01:1 to 1:1. These halogenation reactions are conducted in the additional presence of a halohydrocarbon and an electron donor. An inert hydrocarbon diluent or solvent may also be present. When using an inert diluent or solvent, this should of course not be used as a complete substitute for the halohydrocarbon, for it is an essential feature of this invention that the halogenation reaction proceeds in the presence of a halohydrocarbon.

Suitable halides of tetravalent titanium include aryloxy- or alkoxy-di- and trihalides, such as dihexanoxy-titanium dichloride, diethoxy-titanium dibromide, isopropoxy-titanium tri-iodide and phenoxy-titanium trichloride, titanium tetrahalides are preferred; most preferred is titanium tetrachloride.

Suitable halohydrocarbons are compounds such as butyl chloride, amyl chloride and the following more preferred compounds. Preferred aliphatic halohydrocarbons are halogen-substituted hydrocarbons with 1 to 12, particularly less than 9, carbon atoms per molecule, comprising at least two halogen atoms, such as dibromomethane, trichloromethane, 1,2-dichlorethane, dichlorobutane, 1,1,3-trichloroethane, trichlorocyclohexane, dichlorofluoroethane, trichloropropane, trichlorofluorooctane, dibromodifluorodecane, hexachloroethane and tetrachloroisooctane. Carbon tetrachloride and 1,1,3-trichloroethane are preferred aliphatic halohydrocarbons. Aromatic halohydrocarbons may also be employed, e.g., chlorobenzene, bromobenzene, dichlorobenzene, dichlorodibromobenzene, naphthyl chloride, chlorotoluene, dichlorotoluenes, and the like; chlorobenzene and dichlorobenzene are preferred aromatic halohydrocarbons.

Suitable electron donors which are used in the preparation of the solid catalyst component are ethers, esters, ketones, phenols, amines, amides, imines, nitriles, phosphines, phosphites, stibines, arsines, phosphoramides and alcoholates. Examples of suitable donors are those referred to in U.S. Pat. No. 4,136,243 or its equivalent British Specification No. 1,486,194 and in British Specification No. 1,554,340 or its equivalent German Offenlegungsschrift No. 2,729,126. Preferred donors are esters and diamines, particularly esters of aromatic carboxylic acids, such as ethyl and methyl benzoate, p-methoxy ethyl benzoate, p-ethoxy methyl benzoate, ethyl acrylate, methyl methacrylate, ethyl acetate, dimethyl carbonate, dimethyl adipate, dihexyl fumarate, dibutyl maleate, ethylisopropyl oxalate, p-chloro ethyl benzoate, p-amino hexyl benzoate, isopropyl naphthenate, n-amyl toluate, ethyl cyclohexanoate, propyl pivalate, N,N,N',N'-tetramethylethylene diamine, 1,2,4-trimethyl piperazine, 2,3,4,5-tetraethyl piperidiene and similar compounds. Preferred electron donors for use in preparing the titanium constituent are ethyl benzoate and p-methyl toluate.

The halogenation normally proceeds under formation of a solid reaction product which may be isolated from the liquid reaction medium by filtration decantation or another suitable method and may be subsequently washed with an inert hydrocarbon diluent, such as n-hexane, iso-octane or toluene, to remove any unreacted material, including physically absorbed halohydrocarbon.

As compared with the magnesium chloride supported catalyst components that have been proposed in the prior art and which are prepared by halogenating magnesium compounds with a titanium tetrahalide, the presence of the halohydrocarbon during halogenation of the magnesium compound, followed by a further contact with a tetravalent titanium compound in accordance with the invention, brings about an unexpected increase in the polymerization activity of the resulting catalyst compositions. The reasons for this increase are not exactly known. In the halogenation of magnesium dialkoxides or diaryloxides with titanium tetrahalides the halohydrocarbon is thought to have no halogenating action.

Subsequent to halogenation, the product is contacted with a tetravalent titanium halide such as a dialkoxy-titanium dihalide, alkoxy-titanium trihalide, phenoxy-titanium trihalide or titanium tetrahalide. The most preferred titanium compounds are titanium tetrahalides and especially titanium tetrachloride. This treatment increases the content of tetravalent titanium in the solid catalyst component. This increase should preferably be sufficient to achieve a final atomic ratio of tetravalent titanium to magnesium in the solid catalyst component of from 0.005 to 3.0, particularly of from 0.02 to 1.0. To this purpose the contacting with the tetravalent titanium chloride is most suitably carried out at a temperature of from 60° to 136° C. during 0.1–6 hours, optionally in the presence of an inert hydrocarbon or halohydrocarbon diluent. Particularly preferred contacting temperatures are from 70° to 120° C. and the most preferred contacting periods are between 0.5 to 3.5 hours. The treatment may be carried out in successive contacts of the solid with separate portions of $TiCl_4$.

The preferred halogen atom, possibly contained in the magnesium compound to be halogenated, and contained in the titanium compound which serves as halogenating agent and in the tetravalent titanium halide with which the halogenated product is contacted, is chlorine.

After the treatment with tetravalent titanium halide the catalyst component is suitably isolated from the liquid reaction medium and washed to remove unreacted titanium compound. The titanium content of the final, washed catalyst constituent is suitably between about 1.5 to 3.6 percent by weight or up to about 4.5 percent.

The material used to wash the catalyst component is an inert, light hydrocarbon liquid. Preferred light hydrocarbon liquids are aliphatic, alicyclic and aromatic hydrocarbons. Examples of such liquids include iso-pentane, n-hexane, iso-octane and toluene, with iso-pentane being most preferred.

The amount of light hydrocarbon liquid employed is 50 to 300 cc/gm of procatalyst in 2 to 6 separate washes, preferably about 150 cc/gm.

A key aspect of the present invention is the addition of a certain amount of a hydrocarbon mineral oil. The hydrocarbon mineral oil employed herein is a viscous, principally aliphatic hydrocarbon oil having a viscosity of about 50 to about 2000 SSU at 38° C. The mineral oil should also be essentially non-volatile at ambient conditions, i.e., preferably at least 80% by weight should have an initial boiling point of at least 300° C., corrected to atmospheric pressure. The mineral oil is best obtained from petroleum sources (i.e., it is a distillate product), and the extent of paraffinity, naphthenicity and aromaticity will, of course, be dependent on the particular type of petroleum used as a source material. However, it should be principally paraffinic/naphthenic in nature, i.e., less than about 30% by weight of aromatics (by clay-gel analysis). Commercial mineral oils are well known and include Witco's Kaydol, Shell's Shellflex ® 371, and Arco's Tufflo 6000 Series paraffinic/naphthenic oils.

There are a number of ways to incorporate the hydrocarbon mineral oil with the solid procatalyst component. One method involves merely mixing the dry catalyst powder and the mineral oil. This may be done by spraying the oil on to the dry catalyst powder in a rotating drum mixer.

Another, and more preferred method, involves adding the mineral oil to the mixture of light hydrocarbon liquid and solid catalyst during the wash steps. After the mineral oil is mixed with the light hydrocarbon liquid and solid catalyst, the light hydrocarbon liquid is removed, typically by evaporating the light hydrocarbon liquid. The evaporation or drying treatment is carried out preferably under relatively mild temperature conditions. For example, it is carried out at a temperature of not more than about 80° C., preferably about 0° to about 60° C., in an atmosphere of an inert gas. The drying time depends upon various operating conditions such as temperature. The pressure maintained during the drying of the solid titanium catalyst component is not critical so long as it is lower than the saturated pressure of the light hydrocarbon liquid held in the catalyst component. For example, the drying can be carried out at atmospheric pressure or reduced pressure.

As shown in the examples which follow, this latter method of incorporating the mineral oil may result in a dramatic activity improvement for the catalyst. We assume that the activity improvement is related to enhanced heat removal (during polymerization), from the catalyst active centers, due to the mineral oil trapped in the catalyst pores. These pores (capillary-type) are normally nitrogen-filled voids since viscous mineral oil will not enter the pores when dry catalyst is suspended in oil. Our technique of diluting the required amount of mineral oil in light hydrocarbon liquid diluent (and then evaporating the diluent) greatly reduces the viscosity allowing permeation of the catalyst by mineral oil (as witnessed by the dry, free-flowing nature of the resulting catalyst).

The amount of hydrocarbon mineral oil which is employed herein is a critical aspect of the present invention. Typically, the amount of hydrocarbon mineral oil employed herein is between about 5% by weight and about 25% by weight, based on the combined weight of solid procatalyst component and mineral oil, preferably between about 10%w and about 25%w. The upper (higher) limit for mineral oil addition is most critical, and should be less than the amount whereby the solid component is no longer free-flowing. Above that point the catalyst component becomes tacky. Expressed another way, sufficient mineral oil is added to fill the pores of the solid catalyst. This amount may be determined experimentally, by trial or error, or by measuring the pore volume of the solid catalyst. Pore volume is measured by BET methods. The pore volume of the solid procatalysts employed herein is typically about 0.1 to about 1.0 cc/gm.

The mineral oil-modified catalysts (which are free-flowing, resembling dry powder) may be stored for relatively long periods of time prior to use.

The organoaluminum compound to be employed as cocatalyst may be chosen from any of the known activators in olefin polymerization catalyst systems comprising a titanium halide but is most suitably free of halogens. While trialkylaluminum compounds, dialkylaluminum halides and dialkylaluminum alkoxides may be used, trialkylaluminum compounds are preferred, particularly those wherein each of the alkyl groups has 2 to 6 carbon atoms, e.g., triethylaluminum, tri-n-propylaluminum, triisobutylaluminum, triisopropylaluminum and dibutyl-n-amylaluminum.

Preferred proportions of selectivity control agent, employed separately, in combination with, or reacted with an organoaluminum compound, calculated as mol per mol aluminum compound, are in the range from 0.1 to 1.5, particularly from 0.2 to 0.5.

Proportions of electron donor contained in the solid catalyst component, calculated as mol per mol of magnesium, are suitably in the range of from 0.01 to 10, e.g., from 0.01 to 10 and from 0.05 to 5.0 and especially from 0.05 to 0.5.

To prepare the final polymerization catalyst composition, procatalyst, cocatalyst and selectivity control agent, if used separately, may be simply combined, most suitably employing a molar ratio to produce in the final catalyst an atomic ratio of aluminum to titanium of from 1 to 150, and suitably from about 10 to about 150. The catalysts of this invention tend to exhibit very good activity at much lower Al:Ti ratios, e.g., below 80:1 and even below 50:1, than prior art catalysts of the same type. It may, however, be advantageous under some conditions to employ them at higher Al:Ti ratios. Increasing the Al:Ti ratio tends to increase catalyst activity at the expense of increased catalyst residue in the unextracted product. These factors, as well as the desired level of isotacticity, will be considered in selecting the Al:Ti ratio for any given process and desired product. In general, Al:Ti ratios in the range of 30:1 to 100:1 and especially of about 50:1 to 80:1 will be found advantageous.

The present invention is also concerned with a process for polymerizing an alpha monoolefin such as ethylene or butylene, preferably propylene, employing the novel catalyst components and compositions. These polymerization may be carried out by any of the conventional techniques, such as gas phase polymerization or slurry polymerization using liquid monomer or an inert hydrocarbon diluent as liquid medium. Hydrogen may be used to control the molecular weight of the polymer without detriment to the stereospecific performance of the catalyst compositions. Polymerization may be effected batchwise or continuously with constant or intermittent supply of the novel catalyst compositions or one or more of the catalyst components to the polymerization reactor. The activity and stereospecificity of the novel catalyst compositions are so pronounced that there is no need for any catalyst removal or polymer extraction techniques. Total metal residues in the polymer, i.e., the combined aluminum, magnesium and titanium content, can be as low as 150 ppm, even less than 75 ppm.

It is well known that supported coordination procatalysts and catalyst systems of the type used herein are highly sensitive, in varying degrees, to catalyst poisons such as moisture, oxygen, carbon oxides, acetylenic compounds and sulfur compounds. It will be understood that in the practice of this invention, as well as in the following examples, both the equipment and the reagents and diluents are carefully dried and freed of potential catalyst poisons.

The productivity of the procatalyst is determined as kg polymer/g procatalyst in a standard one hour batch reaction; it may also be expressed as kg polymer/g Ti. Catalyst activity is sometimes reported as kg polymer/g procatalyst/hr. If determined in a standard one hour test, activity thus is numerically the same as productivity. However, supported coordination catalysts tend to exhibit a relatively rapid decrease in activity, so that the initial activity and the effective activity during the first 15–30 minutes of reaction may be significantly higher than activity determined in a one hour test.

The selectivity to isotactic polypropylene is determined by measuring the amount of xylene soluble polymer (XS), in accordance with regulations of the U.S. Food and Drug Administration. The XS test is carried out as follows:

The sample is completely dissolved in xylene, which contains oxidation inhibitor, in a stirred flask by heating under reflux at 120° C. The flask is then immersed in a water bath at 25° C. without stirring for one hour, during which the insoluble portion precipitates. The precipitate is filtered off and the solubles present in the filtrate are determined by evaporating a 20 ml aliquot of the filtrate, drying the residue under vacuum, and weighing the residue. The xylene-solubles consist of amorphous material with some low molecular weight crystalline material. (FDA regulations 121.2501 and 121.2510, 1971.)

The numerical value of XS in the case of propylene homopolymer is typically about 2 percent less than the amount of polymers extractable in refluxing n-heptane. Thus the isotacticity index of polypropylene (amount insoluble in refluxing n-heptane) is approximately $100-(XS+2)$.

Catalyst productivity at standard conditions exhibits an inverse relationship with stereoselectivity. This relationship is characteristic for any given procatalyst. It is generally possible to control these variables, within limits, by changing the proportion of selectivity control agent (SCA). Increasing the amount of SCA increases selectivity to isotactic or stereoregular polymer but reduces activity, and hence productivity, in a standard one hour test. The relationship in propylene polymerization is such that a decrease of 1% of XS, e.g., from 5 to 4, corresponds approximately to a decrease in activity of 5 kg/g/hr.

The following examples illustrate the invention:

EXAMPLES

The Procatalysts

In the following examples, the procatalysts were composites of tetravalent titanium, magnesium, chloride, ethoxy groups and ethyl benzoate. They were prepared by reacting magnesium ethoxide, titanium tetrachloride and ethyl benzoate (EB) in the presence of a halohydrocarbon at elevated temperatures to produce a solid containing Mg, Cl, Ti, —OEt groups and EB, contacting this solid with $TiCl_4$ at elevated temperatures in two or three additional contacting steps, and completely washing off unbound $TiCl_4$ by washes with isopentane.

Four identical procatalyst preparations were executed (Table 1). Catalyst 16352-155 was simply finished, dried and stored as a dry powder in a sealed bottle in a nitrogen-filled dry-box. The remaining catalysts (16352-159, -161, and -167) were prepared and stored in exactly the same manner except immediately prior to evaporating the isopentane originating from the last catalyst wash a known volume of mineral oil was added (10%w, 20%w and 30%w, respectively based on combined weight of catalyst plus mineral oil). On drying the catalyst (i.e., evaporating the isopentane under nitrogen at 40° C.) the mineral oil is forced into the pores of the solid. The pore volume of the catalysts is obviously >20%w and >30%w since the 10%w and 20%w catalysts were dry free-flowing powders whereas the 30%w catalyst was slightly tacky (presumably due to excess mineral oil although it still flowed. A portion of each of these catalysts was made up into a mineral oil slurry ("fresh catalysts") while the remainder was stored in an inert atmosphere (glove box) at ambient temperature. At monthly intervals (1-3 months) portions of each of the catalyst powder remainders were made up into mineral oil slurries; in this way the shelf-life stability of each powder could be determined by running liquid propylene polymerizations with each of the slurries.

TABLE 1

MINERAL OIL-MODIFIED PROCATALYST COMPOSITION

| Catalyst Number | Ti % w | OEt % w | EB % w | Mg % w | Cl % w | i-$C_5$ % w | Mineral Oil % w* |
|---|---|---|---|---|---|---|---|
| 16352-155 | 3.49 | 0.82 | 11.6 | 18.6 | 65.0 | 0.4 | 0 |
| 16352-159 | 3.16 | 0.76 | 11.3 | 16.2 | 55.9 | 2.1 | 10 |
| 16352-161 | 2.92 | 0.75 | 10.7 | 14.8 | 51.6 | 0.4 | 20 |
| 16352-167 | 2.60 | 0.69 | 11.0 | 13.4 | 46.3 | 0.0 | 30 |

*Mineral oil content calculated on the basis of the amount of mineral oil added.

Propylene Polymerization

Unless otherwise stated, propylene polymerization was conducted as follows:

About 1400 gm of liquid propylene and 132 mmol of hydrogen in a one gallon (about 4 liter) autoclave equipped with an agitator, was heated to 60° C. under sufficient pressure to maintain it in liquid phase. A predetermined amount of p-ethyl ethoxy benzoate SCA and 2.5 ml (0.7 mmol) of triethyl aluminum (TEA) as a 5% solution in $C_7$-$C_8$ paraffin diluent were then successively added to the propylene. To the agitated mixture there was added a sufficient amount of the slurry of mineral oil-modified procatalyst in mineral oil slurry (or of unmodified procatalyst in the control experiments) to provide about 0.01 m atoms of titanium.

The mixture was agitated and maintained at 67° C. for one hour. The pressure was then released and the powdered polypropylene recovered.

Results

The polymerization results are listed in Tables 2 (fresh catalysts), 3 (aged one month), 4 (aged two months) and 5 (aged 3 months). Under the conditions used a standard procatalyst would be expected to give yields of 24 kg/g catalyst at 4.5% xylene solubles (XS). The relative performance of the four catalysts is shown in the FIGURE.

Comparing the yield data of 4.5% xylene solubles it can be seen that the dry powder catalyst (16352-155) lost >25% of its original activity after aging for 2 months. On the other hand all of the "mineral oil-modified" catalysts still possessed the expected performance of a fresh catalyst after the same period.

On the basis of the above data we conclude that mineral oil-modification may offer a more convenient (yet equally safe) method of catalyst storage and shipping than the presently used mineral oil slurries.

The data scatter apparent in Tables 2–5 is typical of what is experienced in one gallon autoclaves. In order to be confident about an observation, the experiment in question is typically repeated 2 or more times in order to get a representative average. The unexpectedly good performance of the fresh 10% mineral oil catalyst (16352-159) shown in the FIGURE is the average of five such runs (Table 2); allowing us to conclude that this catalyst (when immediately slurried in mineral oil) really is ~50% more active than a standard procatalyst.

TABLE 2

MINERAL OIL-MODIFIED PROCATALYST POLYMERIZATION RESULTS FRESH CATALYST

| Catalyst Number | Mineral Oil Content, % w | Run # | Yield kg/g Cat | Xylene Solubles % w | Yield at 4.5% XS, kg/g Cat |
|---|---|---|---|---|---|
| 16352-155 | 0 | E-476 | 26.1 | 4.9 | 24.2 |
| | | E-484 | 22.5 | 4.7 | 21.6 |
| | | A-809 | 17.4 | 3.9 | 20.2 |
| | | B-807 | 28.7 | 4.4 | 29.2 |
| | | | | AVERAGE | 23.8 |
| 16352-159 | 10 | G-380 | 40.7 | 4.7 | 39.8 |
| | | F-606 | 32.6 | 4.5 | 32.6 |
| | | E-485 | 30.8 | 4.5 | 30.8 |
| | | G-390 | 43.2 | 5.4 | 39.0 |
| | | G-392 | 30.6 | 4.4 | 31.1 |
| | | | | AVERAGE | 34.7 |
| 16352-161 | 20 | H-388 | 37.2 | 5.5 | 32.5 |
| | | G-388 | 26.9 | 4.6 | 26.4 |
| | | | | AVERAGE | 29.5 |
| 16352-167 | 30 | H-396 | 27.7 | 4.7 | 26.8 |
| | | F-600 | 30.1 | 5.9 | 23.5 |
| | | | | AVERAGE | 25.2 |

TABLE 3

MINERAL OIL-MODIFIED PROCATALYST POLYMERIZATION RESULTS POWDERS AGED ONE MONTH

| Catalyst Number | Mineral Oil Content, % w | Run # | Yield kg/g Cat | Xylene Solubles % w | Yield at 4.5% XS, kg/g Cat |
|---|---|---|---|---|---|
| 16352-155 | 0 | E-479 | 17.1 | 4.1 | 19.0 |
| 16352-159 | 10 | F-602 | 21.6 | 4.5 | 21.6 |
| 16352-161 | 20 | G-383 | 24.9 | 4.3 | 25.8 |
| 16352-167 | 30 | H-391 | 27.9 | 3.9 | 30.7 |

TABLE 4

MINERAL OIL-MODIFIED PROCATALYST POLYMERIZATION RESULTS POWDERS AGED TWO MONTHS

| Catalyst Number | Mineral Oil Content, % w | Run # | Yield kg/g Cat | Xylene Solubles % w | Yield at 4.5% XS, kg/g Cat |
|---|---|---|---|---|---|
| 16352-155 | 0 | E-478 | 16.4 | 4.8 | 15.0 |
| 16352-159 | 10 | F-601 | 26.0 | 5.1 | 23.2 |
| 16352-161 | 20 | G-382 | 19.9 | 3.9 | 22.7 |
| 16352-167 | 30 | D-892 | 26.9 | 4.6 | 26.4 |

TABLE 5

MINERAL OIL-MODIFIED PROCATALYST POLYMERIZATION RESULTS POWDERS AGED THREE MONTHS

| Catalyst Number | Mineral Oil Content, % w | Run # | Yield kg/g Cat | Xylene Solubles % w | Yield at 4.5% XS, kg/g Cat |
|---|---|---|---|---|---|
| 16352-155 | 0 | A-803 | 19.6 | 4.9 | 17.7 |
| 16352-159 | 10 | B-801 | 21.1 | 4.2 | 22.5 |
| 16352-161 | 20 | C-915 | 28.6 | 4.4 | 29.1 |
| 16352-167 | 30 | H-409 | 26.2 | 3.7 | 30.0 |

What is claimed is:

1. A method for preparing high-activity, free-flowing solid catalyst components for alpha monoolefin polymerization comprising:

(a) halogenating a magnesium compound of the formula MgR'R" wherein R' is an alkoxide or aryloxide group and R" is an alkoxide or aryloxide group or halogen, with a halide of tetravalent titanium in the presence of a halohydrocarbon and an ester electron donor, and separating the solid reaction product from the reaction mixture;

(b) contacting the halogenated product with a tetravalent titanium halide and separating the resulting solid;

(c) contacting the resulting solid with an inert, light hydrocarbon liquid wherein said inert light hydrocarbon liquid is selected from the group consisting of iso-pentane, n-hexane, iso-octane and toluene to remove unreacted titanium compounds;

(d) adding a certain amount of a hydrocarbon mineral oil to a mixture of light hydrocarbon liquid and solid product, said mineral oil being a viscous, paraffinic/naphthenic hydrocarbon oil having a viscosity of about 50 to about 2000 SSU at 38° C. and wherein at least 80% by weight of said hydrocarbon mineral oil has an initial boiling point of 300° C. or higher, corrected to atmospheric pressure; and (e) removing by evaporation the light hydrocarbon liquid from the resulting mixture, wherein the amount of hydrocarbon mineral oil added in step (d) is between about five percent by weight and 25 percent by weight, based on the combined weight of the solid component plus mineral oil, and is less than the amount whereby the resulting solid product is no longer free-flowing.

2. The method of claim 1 wherein said magnesium compound is a magnesium dialkoxide.

3. The method of claim 1 wherein said hydrocarbon mineral oil has an aromatic content by clay-gel analysis of less than about 30% by weight.

4. The method of claim 1 wherein the amount of hydrocarbon mineral oil is between about 10 percent by weight and about 25 percent by weight.

5. A free-flowing, high activity, stable catalyst composition for alpha monoolefin polymerization comprising a porous solid component and a hydrocarbon mineral oil wherein:

(a) said porous solid component comprises titanium tetrachloride, magnesium chloride and ester electron donor, having a pore volume of between about 0.1 and about 1.0 cc/gm;

(b) said hydrocarbon mineral oil is a viscous, paraffinic/naphthenic hydrocarbon oil having a viscosity of about 50 to about 2000 SSU at 38° C. and wherein at least 80% by weight of said hydrocarbon mineral oil has an initial boiling point of 300° C. or higher, corrected to atmospheric pressure; and (c) said hydrocarbon mineral oil is mixed with said porous solid component such that the mineral oil fills the pores of said solid component and the resulting mineral oil-modified solid component remains relatively dry and free-flowing at ambient conditions and wherein the amount of hydrocarbon mineral oil is between about 5 percent by weight and about 25 percent by weight, based on the combined weight of said solid component and said hydrocarbon mineral oil.

6. The composition of claim 5 wherein said hydrocarbon mineral oil has an aromatic content by clay-gel analysis of less than about 30% by weight.

7. The composition of claim 5 wherein the amount of hydrocarbon mineral oil is between about 10 percent by weight and about 25 percent by weight.

* * * * *